United States Patent [19]
Dekel et al.

[11] Patent Number: 5,430,656
[45] Date of Patent: Jul. 4, 1995

[54] MOBILE COMMUNICATIONS SYSTEM

[76] Inventors: Itzhak Dekel, 3 Emek Hashoshanim Street, Nes Ziona 70 400; Shlomo Feldhammer, 19 Hantke Street, Haifa 34 606, both of Israel

[21] Appl. No.: 118,052

[22] Filed: Sep. 8, 1993

[30] Foreign Application Priority Data

Sep. 8, 1992 [IL] Israel .................................. 103108

[51] Int. Cl.⁶ ............................................. G01C 21/20
[52] U.S. Cl. ..................................... 364/449; 364/443; 364/460; 342/457
[58] Field of Search ............... 364/449, 436, 460, 443; 342/357, 457

[56] References Cited

U.S. PATENT DOCUMENTS

| | | | |
|---|---|---|---|
| 5,153,836 | 10/1992 | Fraughton et al. | 364/461 |
| 5,223,844 | 6/1993 | Mansell et al. | 342/357 |
| 5,235,633 | 8/1993 | Dennison et al. | 379/60 |
| 5,301,368 | 4/1994 | Hirata | 455/78 |

OTHER PUBLICATIONS

Ball Communications Systems Division, Broomfield, Colorado, "Specifications—GPS Antenna Elements", no date.
Reflection Industrial Co. Ltd., Taipei, Taiwan, R.O.C., "RICALM RF Auto Security System", no date.
Magellan Systems Corporation, "GPS Magellan 5–Channel Technology", Specifications, Part No. 00-850-00-000, Sep. 24, 1991.
Kantronics Inc., "KPC-2 Packet Communicator II", 1989.
Magellan Systems Corporation, "Hardware User's Guide", Feb. 14, 1991.
Motorola Radius Division, "RNet Series Telemetry Radio", Specifications, no date.
Sensor Systems, Chatsworth, Calif., USA, Antennas, Apr., 1989.

*Primary Examiner*—Kevin J. Teska
*Assistant Examiner*—Susan Wieland
*Attorney, Agent, or Firm*—Weingarten, Schurgin, Gagnebin & Hayes

[57] ABSTRACT

A vehicle locator and communication system including a plurality of road vehicle mounted GPS receivers, each for receiving navigation signals from a plurality of GPS satellites, a plurality of road vehicle mounted communicators, an airborne control transceiver communicating with the plurality of road vehicle mounted communicators and a central control unit communicating with the airborne control transceiver for monitoring the location and communications of a plurality of road vehicles.

18 Claims, 4 Drawing Sheets

MOBILE COMMUNICATIONS SYSTEM

FIELD OF THE INVENTION

The present invention relates to mobile communications systems generally and more particularly to vehicle location and warning indication systems.

BACKGROUND OF THE INVENTION

There are known a large variety of vehicle locator systems for use with various vehicles. Ships and aircraft commonly use GPS (Global Positioning System) receivers which receive navigation signals from a plurality of satellites. GPS systems are not commonly known for use in road vehicles.

Mobile communications systems have developed quickly in recent years. Cellular telephone systems for road vehicles are in widespread use in various parts of the world.

SUMMARY OF THE INVENTION

The present invention seeks to provide an improved road vehicle locator and communication system.

There is thus provided in accordance with a preferred embodiment of the present invention a vehicle locator and communication system including a plurality of road vehicle mounted GPS receivers, each for receiving navigation signals from a plurality of GPS satellites, a plurality of road vehicle mounted communicators, an airborne control transceiver communicating with the plurality of road vehicle mounted communicators and a central control unit communicating with the airborne control transceiver for monitoring the location and communications of a plurality of road vehicles.

In accordance with a preferred embodiment of the present invention, the road vehicle mounted communicator receives inputs from at least one of an alarm system and a keyboard located in the vehicle.

Additionally in accordance with a preferred embodiment of the present invention, the road vehicle mounted communicator is operative to transmit communications in at least one of the VHF or UHF bands. Preferably, the communicator is operative to automatically switch bands as necessary to realize optimal communications with the airborne transceiver.

In accordance with a preferred embodiment of the present invention, the airborne transceiver may be mounted on any suitable airborne platform, such as an airplane, helicopter or balloon. The receiver may merely comprise a repeater or alternatively may include additionally signal processing and other suitable apparatus.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
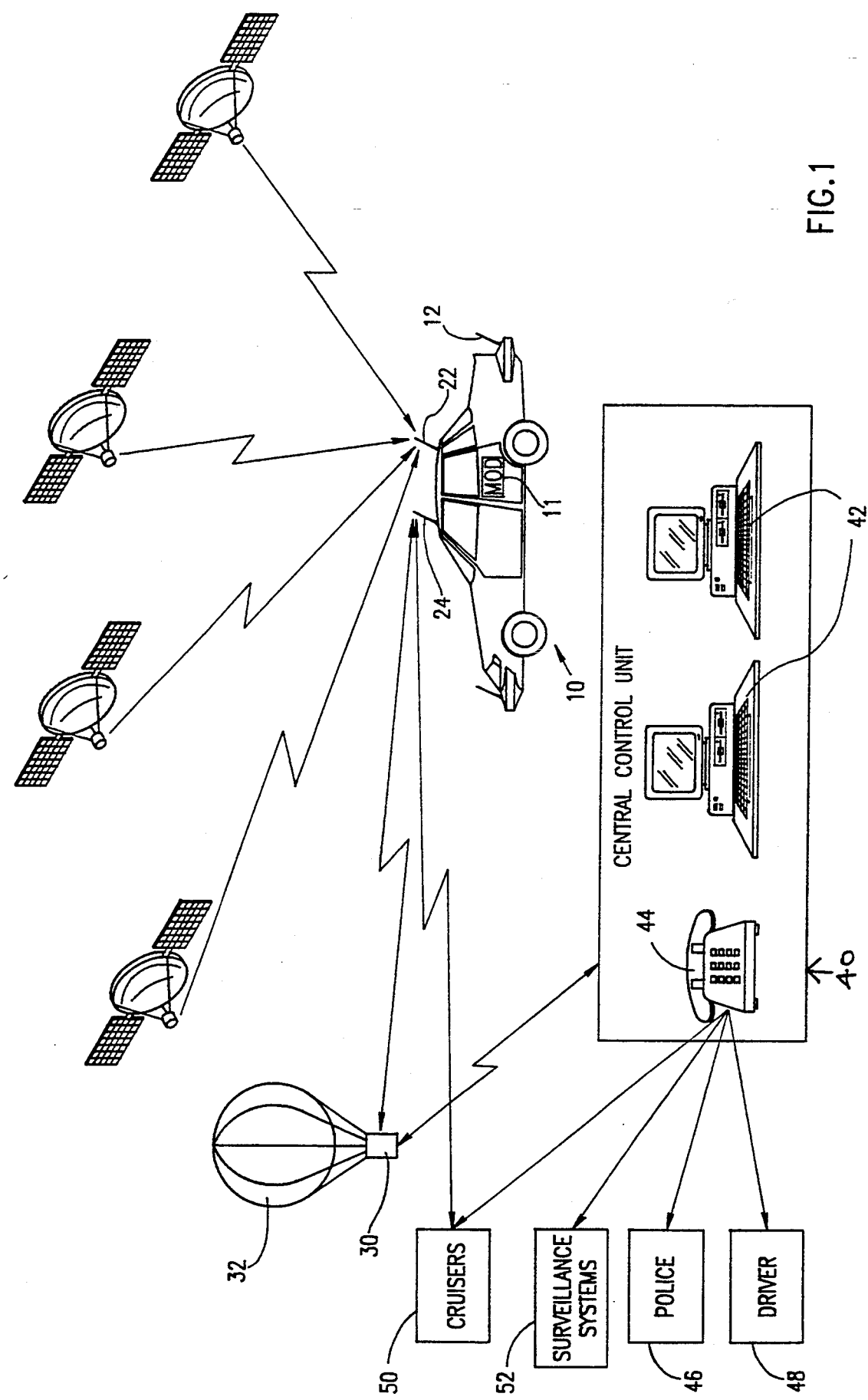
FIG. 1 is a simplified illustration of a vehicle locator and communication system constructed and operative in accordance with a preferred embodiment of the present invention.
Figure 2:
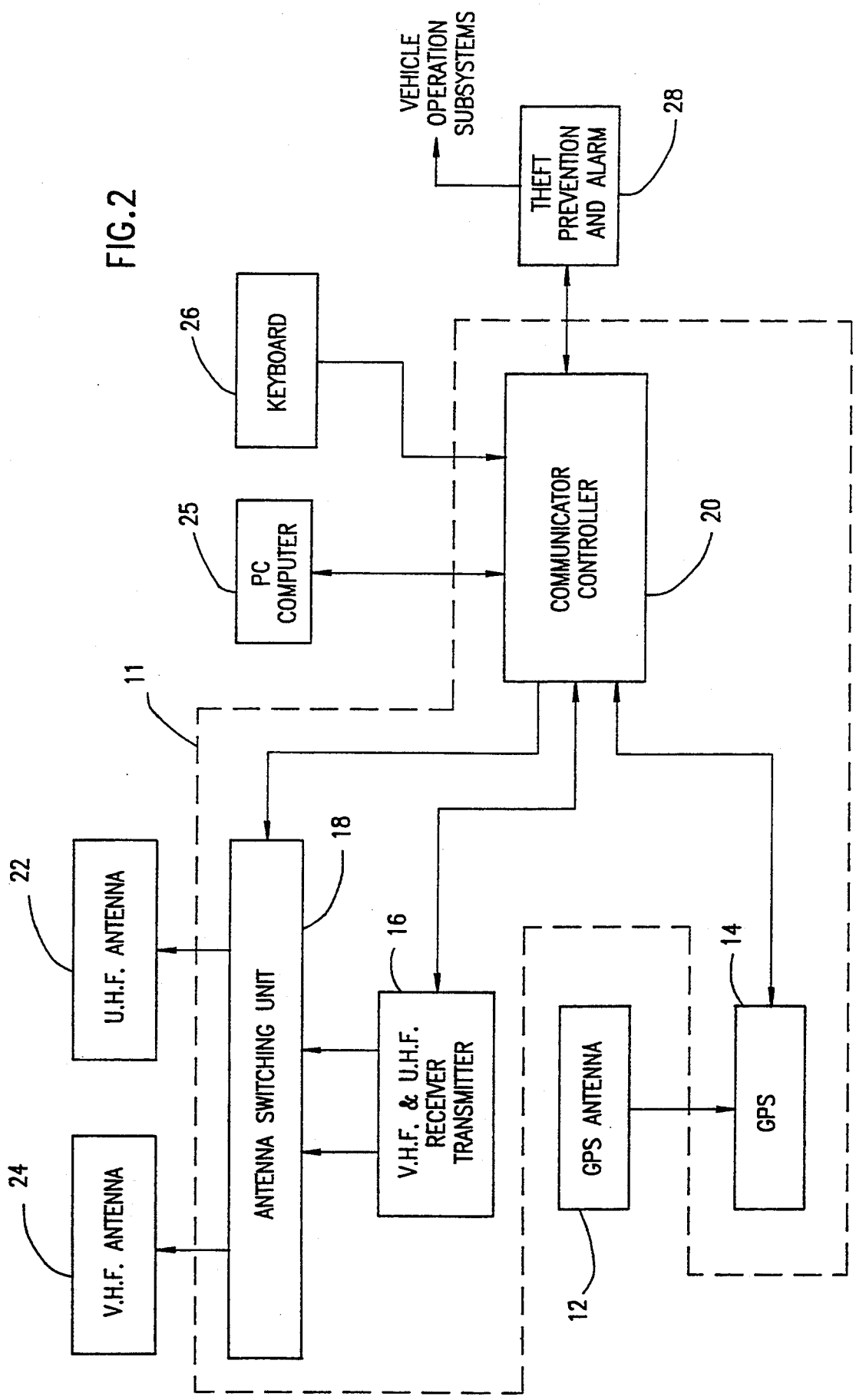
FIG. 2 is a simplified block diagram illustration of a vehicle mounted subsystem forming part of the system of FIG. 1.
Figure 3:
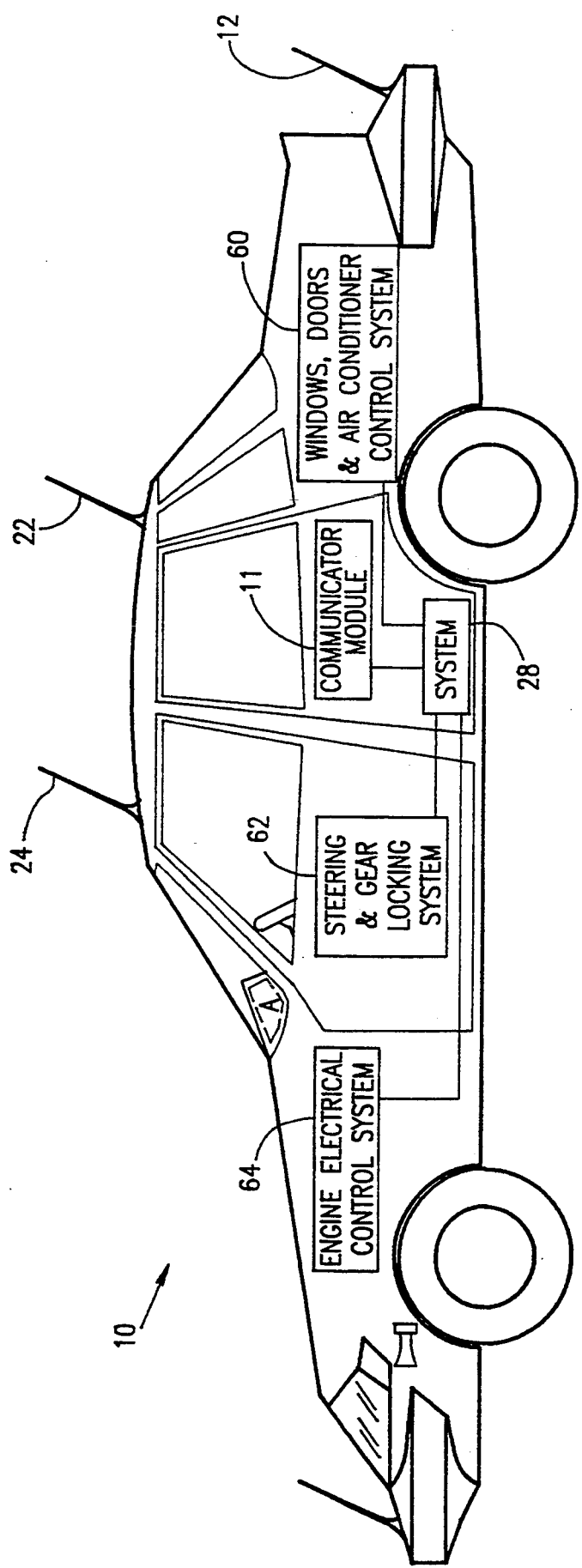
FIG. 3 is a simplified illustration of a road vehicle including a plurality of systems which may interact with the subsystem of FIG. 2.

Reference is now made to FIGS. 1-3, which illustrate, in simplified form, a vehicle locator and communication system constructed and operative in accordance with a preferred embodiment of the present invention.

The system of FIG. 1 comprises a multiplicity of vehicles 10, each of which includes a vehicle locator/communicator module 11 and GPS antenna 12. Module 11 is illustrated generally in FIG. 2 and includes a GPS receiver 14, such as a Magellan 5-Channel GPS receiver module, commercially available from Magellan Systems Corporation of Monrovia, Calif., a VHF/UHF transmitter 16, such as a RNet Series Telemetry Radio, commercially available from Motorola, an antenna switching unit 18 and a communicator controller 20, such as a KPC-2 Packet Communicator II, commercially available from Kantronics of Lawrence, Kan., U.S.A., whose functionality will be described hereinbelow.

Communicator controller 20 may also interface with a vehicle mounted PC type computer 25 and with a vehicle mounted control keyboard 26. Communicator controller 20 preferably also interfaces with a vehicle theft prevention and alarm system 28, which in turn may control various vehicle functions, as will be described hereinbelow in connection with FIG. 3.

Module 11 communicates via at least one of UHF AND VHF antennas 22 and 24 with an airborne transceiver 30, which is shown mounted on a balloon 32, but may instead by located on any other suitable airborne platform, such as an airplane, helicopter or dirigible. Transceiver 30 may comprise any suitable commercially available transceiver.

Transceiver 30 communicates, in turn, with a central control unit 40, which may comprise one or more computers 42 and telecommunications apparatus 44. Central control unit 40 is normally manned by an operator, but alternatively could be fully automated and not require an operator. The telecommunications apparatus 44 may maintain voice and/or data links with the police network 46, the owner and/or driver of the vehicle 48, land based cruisers 50 and/or other surveillance systems 52. The vehicle 10 may also be in direct communication with cruisers 50.

Referring now to FIG. 3, it is seen that the communicator module 11 may be interconnected by the theft prevention and alarm system 28 with one or more vehicle operation subsystems, such as the windows, doors and air conditioner control system 60, the steering and gear locking system 62 and the engine electrical control system 64. This interconnection allows one or more of the vehicle operation subsystems to be disabled or operated under control of the central control unit 40 rather than under driver control, in appropriate emergency situations, such as when the vehicle 10 is reported stolen. Under certain circumstances, such as when a cruiser 50 is in eye contact with the vehicle 10, one or more vehicle operation subsystems may be operated under the control of cruiser 50.

Figure 4:
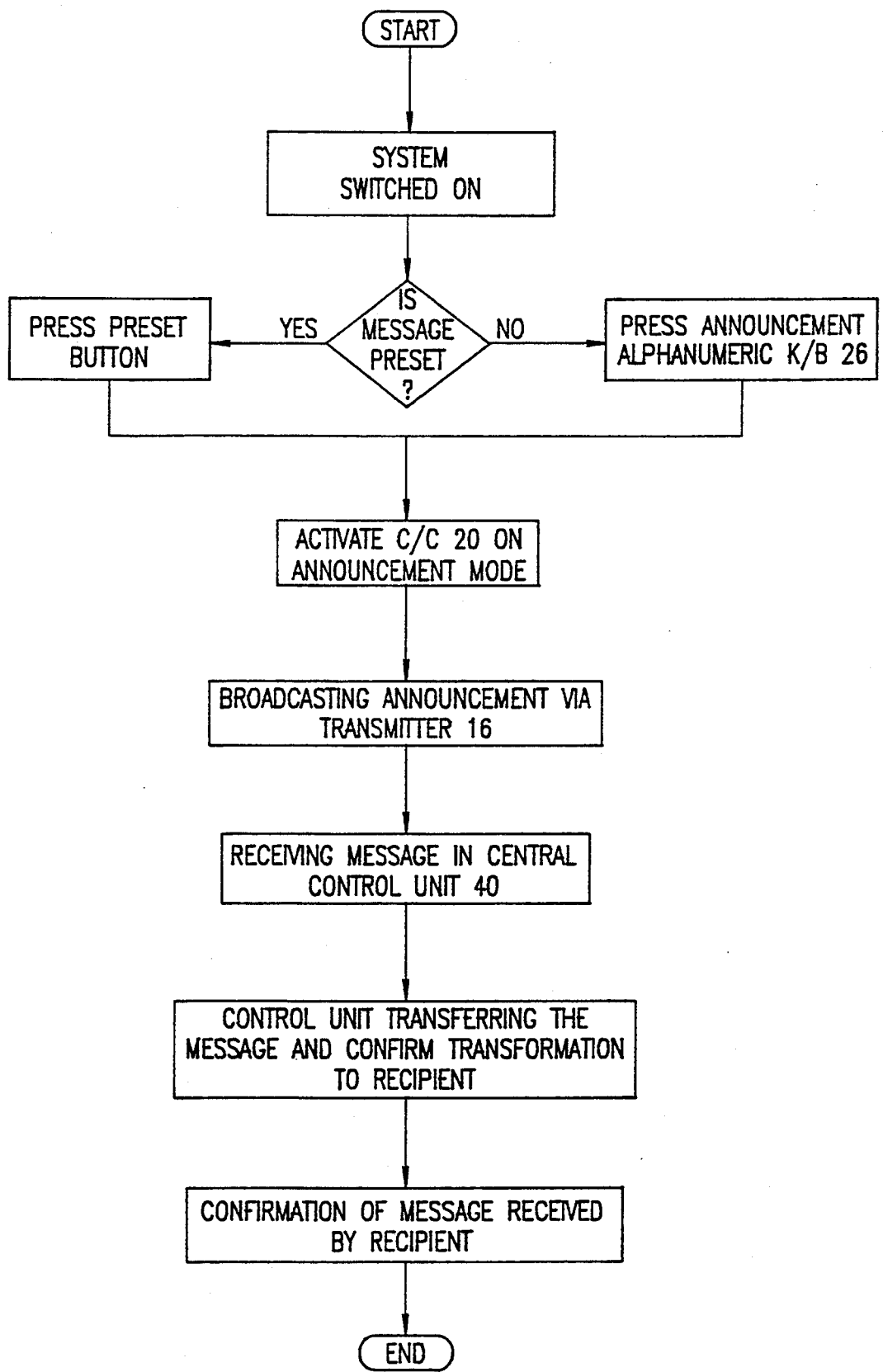
FIG. 4 is a flow chart illustrating a message transfer operation of the system of FIGS. 1-3.

In accordance with one embodiment of the present invention, the communicator controller 20 may be operative to transmit preset or operator generated messages to the central control unit 40. FIG. 4 illustrates, in flow chart form, appropriate functionality which is self explanatory. It is appreciated that the preset messages may be emergency messages, reporting on the existence of one of a number of emergency occurrences, such as robbery, accident, vehicle failure, lack of fuel or a medical emergency. Vehicle theft messages may be automatically transmitted upon unauthorized use of the vehicle.

Generally speaking all messages transmitted by the system are accompanied by information related to vehicle identification and current vehicle location. The messages are retransmitted at desired intervals with updates on vehicle location and status. The updates may include information on vehicle direction, speed and acceleration.

Upon receipt of such messages, the central control unit 40 may transmit preset or custom instructions to the theft prevention and alarm system 28 to control vehicle operation or disable vehicle components as appropriate. It may also send voice messages to the driver of the vehicle as appropriate.

Monitoring of the location of the vehicle may be initiated by the central control unit 40 upon suitable authorization of the owner/authorized operator of the vehicle or automatically in response to sensed operation of the vehicle without appropriate authorization having been entered into system 28 or via computer 25 or keyboard 26 into communicator/controller 20. Suitable access and identification codes can be used to authenticate authorizations and instructions.

It will be appreciated by persons skilled in the art that the present invention is not limited to what has been particularly shown and described hereinabove. Rather the scope of the present invention is defined only by the claims which follow:

We Claim:

1. A vehicle locator and communication system including a plurality of road vehicle mounted GPS receivers, each for receiving navigation signals from a plurality of GPS satellites, a plurality of road vehicle mounted communicators, an airborne control transceiver communicating with the plurality of road vehicle mounted communicators and a central control unit communicating with the airborne control transceiver for monitoring the location and communications of a plurality of road vehicles.

2. Apparatus according to claim 1 and wherein the road vehicle mounted communicator receives inputs from at least one of a theft prevention/alarm system and a keyboard located in the vehicle.

3. Apparatus according to claim 2 and wherein said communicator is operative to automatically transmit messages containing vehicle location and identification.

4. Apparatus according to claim 2 and wherein the road vehicle mounted communicator is operative to transmit communications in at least one of the VHF or UHF bands.

5. Apparatus according to claim 4 and wherein said communicator is operative to automatically switch bands as necessary to realize optimal communications with the airborne transceiver.

6. Apparatus according to claim 2 and wherein said communicator is operative to control the operation of vehicle subsystems in accordance with instructions received from said central control unit.

7. Apparatus according to claim 1 and wherein said communicator is operative to automatically transmit messages containing vehicle location and identification.

8. Apparatus according to claim 7 and wherein said communicator is operative to control the operation of vehicle subsystems in accordance with instructions received from said central control unit.

9. Apparatus according to claim 1 and wherein the road vehicle mounted communicator is operative to transmit communications in at least one of the VHF or UHF bands.

11. Apparatus according to claim 10 and wherein said communicator is operative to automatically transmit messages containing vehicle location and identification.

13. Apparatus according to claim 9 and wherein said communicator is operative to control the operation of vehicle subsystems in accordance with instructions received from said central control unit.

14. Apparatus according to claim 9 and wherein said communicator is operative to automatically transmit messages containing vehicle location and identification.

10. Apparatus according to claim 9 and wherein said communicator is operative to automatically switch bands as necessary to realize optimal communications with the airborne transceiver.

12. Apparatus according to claim 10 and wherein said communicator is operative to control the operation of vehicle subsystems in accordance with instructions received from said central control unit.

15. Apparatus according to claim 1 and wherein said communicator is operative to control the operation of vehicle subsystems in accordance with instructions received from said central control unit.

16. Apparatus according to claim 15 and also being operative to selectively disable selected vehicle subsystems in response to control instructions transmitted via said central control unit.

17. Apparatus according to claim 1 and wherein said central control unit communicates with land-based cruisers and law enforcement groups.

18. Apparatus according to claim 17 and also being operative to selectively disable selected vehicle subsystems in response to control instructions transmitted via said central control unit.

* * * * *

UNITED STATES PATENT AND TRADEMARK OFFICE
CERTIFICATE OF CORRECTION

PATENT NO. : 5,430,656
DATED : July 4, 1995
INVENTOR(S) : Itzhak Dekel et al.

It is certified that error appears in the above-indentified patent and that said Letters Patent is hereby corrected as shown below:

Column 4, line 22,
Claim 10 should follow claim 9; and claim 12 should follow claim 11.

Signed and Sealed this

Twenty-third Day of April, 1996

Attest:

BRUCE LEHMAN

Attesting Officer          Commissioner of Patents and Trademarks